United States Patent [19]

Suzuki

[11] Patent Number: 4,982,211
[45] Date of Patent: Jan. 1, 1991

[54] CAMERA

[75] Inventor: Toyotoshi Suzuki, Tokyo, Japan

[73] Assignee: Canon Kabushiki Kaisha, Tokyo, Japan

[21] Appl. No.: 453,389

[22] Filed: Dec. 15, 1989

Related U.S. Application Data

[63] Continuation of Ser. No. 190,375, May 5, 1988, abandoned.

[30] Foreign Application Priority Data

| May 14, 1987 | [JP] | Japan | 62-117606 |
| May 14, 1987 | [JP] | Japan | 62-117607 |
| May 14, 1987 | [JP] | Japan | 62-117608 |
| May 14, 1987 | [JP] | Japan | 62-117609 |
| May 14, 1987 | [JP] | Japan | 62-117610 |
| May 14, 1987 | [JP] | Japan | 62-117617 |

[51] Int. Cl.⁵ .............................................. G03B 1/12
[52] U.S. Cl. .................................................. 354/173.1
[58] Field of Search .......................... 354/173.1, 173.11

[56] References Cited

U.S. PATENT DOCUMENTS 4,779,111 10/1988 Ogawa ............................ 354/173.11

Primary Examiner—Michael L. Gellner
Attorney, Agent, or Firm—Fitzpatrick, Cella, Harper & Scinto

[57] ABSTRACT

A camera capable, upon insertion of a film cartridge having a leader of film outside the cartridge into a cartridge chamber of the camera leaving the leader outside the camera, of feeding the leader first backward into the interior of the camera and then forward to a film takeup spool of the camera, includes a closing mechanism for closing the cartridge chamber, a transporter for transporting the film, and an operating system for operating the closing mechanism by a driving power of the transporter means.

69 Claims, 15 Drawing Sheets

CAMERA

This application is a continuation of application Ser. No. 190,375 filed May 5, 1988, now abandoned.

BACKGROUND OF THE INVENTION

1. Field of the Invention

This invention relates to cameras and, more particularly, to improvements of the camera in which a film cartridge with the film leader out is inserted into the cartridge chamber and the lid therefor is closed leaving the film leader protruding outside, thereupon the film leader is pulled into the camera housing and then turned toward the takeup spool.

2. Description of the Related Art

The cameras of the type using roll film in the cartridge had the drawback that the film loading operation was troublesome. Therefore, until even now, various proposals for cameras of ever simpler film loading management in the above-described type have been made.

A novel camera of the film quick-load type which enables the film to be loaded very easily and quickly is proposed in U.S. Pat. Nos. 4,779,111, issued Oct. 18, 1988 and 4,780,734, issued Oct. 25, 1988; and U.S. patent application Ser. No. 228,767, filed Aug. 4, 1988 (a continuation of U.S. Ser. No. 134,614, filed Dec. 11, 1987 which was a continuation of U.S. Ser. No. 026,267, filed Mar. 16, 1987, both now abandoned) and U.S. patent application Ser. No. 358,462, filed May 30, 1989 (a continuation of U.S. Ser. No. 289,454, filed Dec. 22, 1988 which is a continuation of U.S. Ser. No. 094,893, filed Sept. 10, 1987, both now abandoned). The two pending applications are being examined in Group 211.

The novel camera of the film quick-load type in the above-identified proposals is a camera that when being loaded with film, the film cartridge is inserted into the cartridge chamber, and, while the film leader protruding outwardly of the mouth of the cartridge is left outside the camera housing, the user only closes the lid of the cartridge chamber. Without having to do anything more, the film loading operation completes itself. In more detail, when that lid is closed, the film leader is automatically pulled into the interior of the camera housing, and a blank winding up follows until the film leader is connected to the takeup spool. Thus, the loading of the camera with film is completed.

In such a camera having the above function as previously proposed by the present patent application, a film loading operation is very simple, so that the camera is very easy to handle. However, there are the following problems to be solved.

That is, in the above-described camera, most of the mechanisms concerning the film loading operation are automated. Yet, as the lid of the cartridge chamber cannot close by itself, the user has to manipulate it carefully. On this point and others associated therewith, there remains room for further improvement.

SUMMARY OF THE INVENTION

With the foregoing in mind, the present invention has been made and its first object is to provide a camera of the type in which after a film cartridge with its film leader protruding outwardly of the mouth of the cartridge is inserted into and seated in the cartridge chamber leaving the film leader outside of the camera, the protruding film leader is first pulled in from the outside of the camera housing and then fed to the takeup spool, the camera being provided with closing means for closing the cartridge chamber, transport means for transporting the film, and operating means receptive of the driving power of the transport means for operating the closing means, and the arrangement being made very effective so that the operation of the closing means can automatically be carried out, thus achieving a further improvement of the manageability of the camera of the type described above.

A second object of the invention is to provide for a camera of the type described above with closing means for closing the cartridge chamber, an electric motor for driving the closing means, and absorbing means arranged upon happening of an event that at a time during the operation of the closing means by the driving power of the motor, such a force as to stop the operation of the closing means is applied to the closing means, to absorb the driving power from the motor, thereby giving not only the advantage of improving the manageability of the camera of the type described above by making automatic the operation of the closing means, but also an advantage of insuring the reliability that even if the closing means when moving by the driving power of the motor is accidentally braked, the driving power of the motor does not result in destruction of any means.

A third object of the invention is to provide for a camera of the type described above with closing means for closing the cartridge chamber, determining means for determining when the protruding film leader is fully pulled in from the outside of the camera, and control means responsive to production of that output of the determining means which represents the completion of the pulling-in for moving the closing means to the totally closing state, thereby giving an advantage that the necessity of providing the light shielding member in the entrance at which the protruding film leader out of the film cartridge is pulled into the camera is removed to eliminate the problems arising from the use of the light shielding member, for example, the dependence of the durability on the member, and the increased load on the film leader being pulled.

A fourth object of the invention is to provide for a camera of the type described with closing means for closing the cartridge chamber, an electric motor for driving the closing means in the closing direction, and control means responsive to stimulus of movement of the closing means from the open to the closing position for actuating the motor, thereby giving an advantage that, for the start of energization of the motor, the user needs only to strike motion of the closing means to the closing direction, or to take an apprehensible action in relation to the closing operation of the closing means, and the subsequent closing operation of the closing means is automatically carried out, thus contributing to a further improvement of the manageability of the camera of the type described.

A fifth object of the invention is to provide for a camera of the type described with closing means for closing the cartridge chamber, drive means for driving the closing means, and release means responsive to setting of the closing means in the fully open position for taking the closing means out of drive connection with the drive means to render the closing means operable independently of the drive means, thereby the operation of the closing means can be performed either manually or automatically as desired, thus contributing to a further improvement of the manageability of the camera of the type described.

A sixth object of the invention is to provide for a camera of the type described with closing means for closing the cartridge chamber, and rotary means for rotating the closing means almost concentrically about the center of rotation of the fork which transmits the driving torque to the supply spool in the cartridge so that the closing means performs its closing operation, thereby giving an advantage that when the cartridge is inserted into and seated in the chamber, the user is freed from taking care of what direction the film pull-out mouth of the cartridge should be oriented to, which would otherwise be important to do as in the prior-known camera of the type described.

Other objects of the invention will become apparent from the following description of embodiments thereof.

BRIEF DESCRIPTION OF THE DRAWINGS

FIG. 7 is similar to FIG. 6 except when the film leader is being pulled in.

DETAILED DESCRIPTION OF THE PREFERRED EMBODIMENTS

The invention is next described in connection with embodiments thereof by reference to the drawings.

Figure 1:
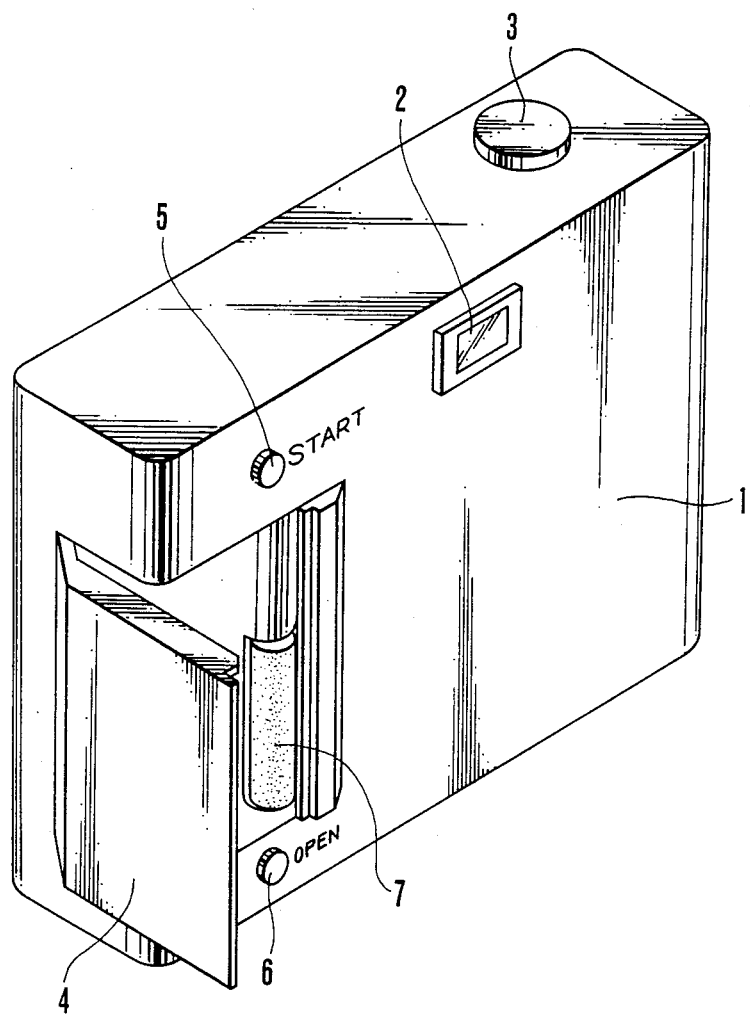
FIG. 1 is a perspective view of an embodiment of a camera according to the invention.

In FIG. 1 there is shown the outer appearance of an embodiment of a camera according to the invention with the chamber lid opened. A camera housing 1 has a finder eyepiece 2, a release button 3, a back lid 4 as the closing means for opening and closing the cartridge chamber, a start button 5, an open button 6 and a transport roller 7.

Figure 2:
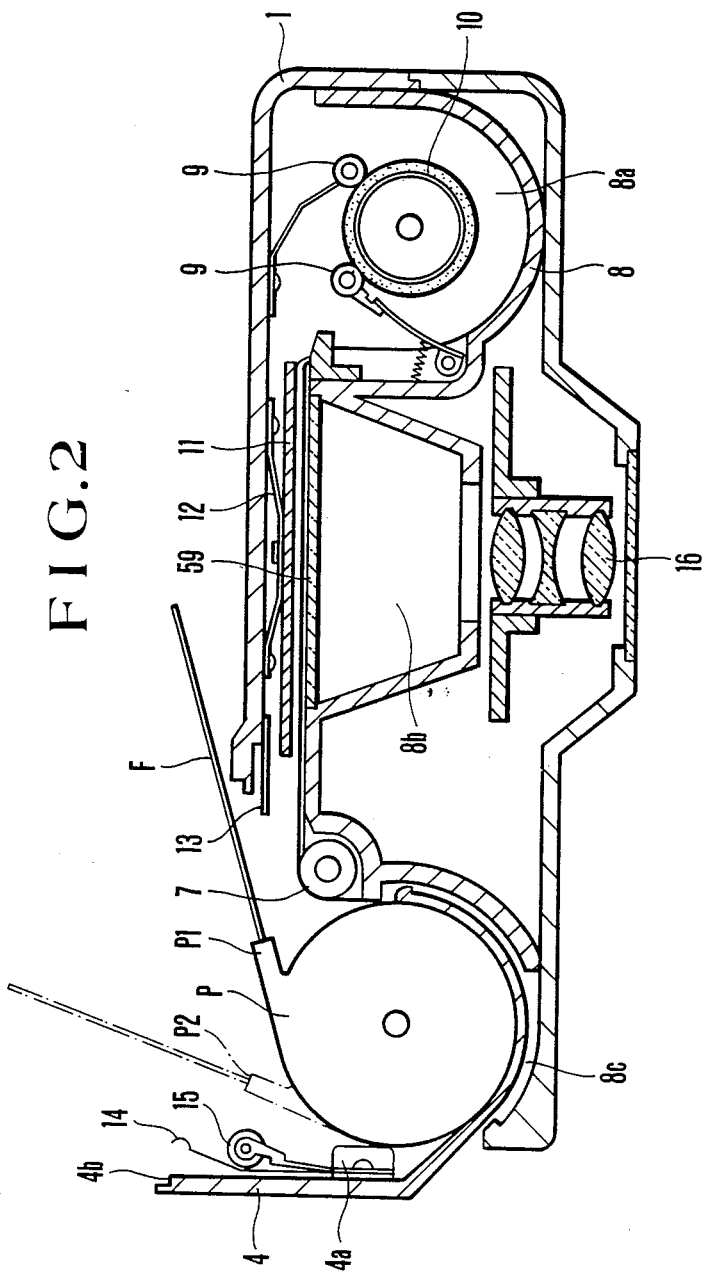
FIG. 2 is a cross-sectional view of the camera of FIG. 1.

FIG. 2 shows the internal structure of the camera of FIG. 1 with a film cartridge seated in a chamber 8c. A framework 8 has a takeup spool chamber 8a and an exposure aperture 8b and also forms the cartridge chamber 8c together with the housing 1. A pair of film guide rollers 9 are pressed on the outer periphery of a takeup spool 10 by known means. A presser plate 11 cooperates with a leaf spring 12 to form a film transport path as well known in the art. A detector or switch for the tip of the film leader is comprised of a fixed contact 13 on the inside of the housing 1 and a pair of movable contacts 14 on the inside of the lid 4. A film presser roller 15 and a cartridge push protuberance 4a also are fixedly mounted on the inside of the lid 4. The free end of the lid 4 has a stepped-down portion 4b formed therein to assure light-tightening. The lid 4 itself is rotatably mounted on the framework in concentric relation to the axis of rotation of a film rewind fork. Also, the transport roller 7 is rotatably mounted on the framework 8. The film cartridge P in the chamber 8c has a mouth $P_1$ from which the film leader F protrudes. A glass plate 59 is fixedly mounted in the exposure aperture 8b at a focal plane of a photographic lens 16.

Figure 3:
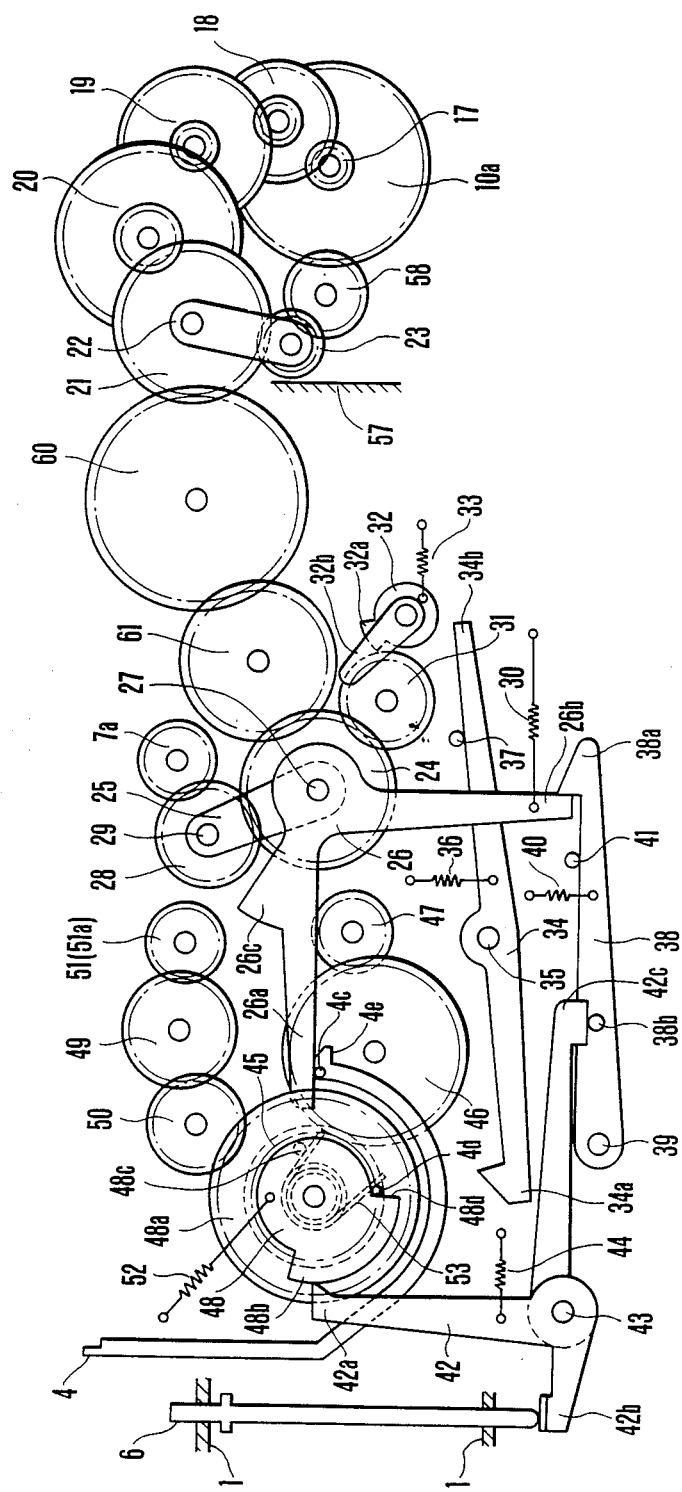
FIG. 3 is a top view of the gearing arrangement in the camera of FIG. 1.

FIG. 3 shows the construction and arrangement of gears in the camera of FIG. 1. Each of the gears shown here is rotatably mounted, unless otherwise specified, either on a base plate (not shown) or on the framework 8. A pinion 17 on the output shaft of an electric motor to be described later meshes with a speed reduction train of gears 18, 19 and 20, each of which is in the unified form of two gear elements of large and small diameters, and all of which are successively engaged with each other to speed down motion of the motor to produce a high torque at the output. A first sun gear 21 is in mesh with the speed reduction gear 20 and is rotatably mounted together with a first planet lever 22. A first planet gear 23 meshes with the first sun gear 21, and is rotatably mounted through a suitable friction to the first planet lever 22. A spool gear 10a is formed in unison with the spool shown in FIG. 2 and is arranged so that the driving power of the first planet gear 32 can be transmitted to it through an intermediate gear 58. A second sun gear 24 is connected through intermediate gears 60 and 61 to the first sun gear 21, and rotatably mounted on a common shaft 27 of a second planet lever 25 and a crank lever 26. A second planet gear 28 meshes with the second sun gear 24 and is rotatably mounted through a friction to the second planet lever 25. A shaft 29 of the second planet gear 28 projects to the upper side of the planet lever 25.

The crank lever 26 has arms 26a and 26b and an arrest portion 26c and is urged by a spring 30 toward a counterclockwise direction so that the arm 26a abuts on a pin 4c of the lid 4. A gear 7a formed in unison with the transport roller 7 shown in FIG. 2 is arranged to mesh with the second planet gear 28. A cam gear 32 has a toothed portion 32a in the outer periphery thereof, through which it is connected to the second sun gear 24 after an intermediate gear 31. The cam gear 32 is formed in unison also with a charge cam 32b. A spring 33 urges a latch lever 34 has a pawl 34a and a tail 34b and is rotatably mounted on a shaft 35. A spring 36 urges the latch lever 34 in a counterclockwise direction to abut on a stopper 37. The tail 34b extends into the path of movement of the charge cam 32b. A hook lever 38 has its free end formed to a hook 38a, which is engageable with the arm 26b of the crank lever 26, and has a pin 38a. A spring 40 urges the hook lever 38 to turn about a shaft 39 in a counterclockwise direction to abut on a stopper 41. A lock lever 42 has a pawl 42a and arms 42b and 42c and is rotatably mounted on a shaft 43. A spring 44 urges the lock lever 42 to a clockwise direction. The lock lever arm 42c is engageable with the pin 38b on the hook lever 38. A rod whose upper end projects outwardly of the camera housing 1 to constitute the open button 6 shown in FIG. 1 is slidably guided by a pair of fitted holes in the housing 1, the opposite end of which rests on the lock lever arm 42b. A fork gear 45 is positioned on the inside of the upper panel of the housing 1 in key connection with a rewind fork to be described later and meshes with an intermediate gear 46 which meshes with a first input gear 47. Meanwhile, this first input gear 47 is arranged to engage the second planet gear 28. A charge disc 48 to be described later has a gear 48a in unified form therewith positioned on the inside of the lower panel of the housing 1 to be connected through intermediate gears 49 and 50 to a second input gear 51. This gear 51 is fixedly mounted on the lower end of a long shaft, the upper end of which fixedly carries another second input gear 51a. This gear 51a is arranged to engage the second planet gear 28. The charge disc 48 has a large diameter portion 48b on which the pawl 42a of the lock lever 42 abuts, and a pin 48c, and is urged by a spring 52 in a counterclockwise direction. Also, the lid 4 is provided with a pin 4d. This pin 4d is made engageable with the radial shoulder 48d of the large diameter portion 48b of the charge disc 48. The absorbing means in the form of a hairpin spring 53 is tensioned between the pin 48c on the charge disc 48 and the pin 4d on the lid 4 so that the charge disc 48 and the lid 4 normally rotate in unison by the absorption spring 53.

Figure 4:
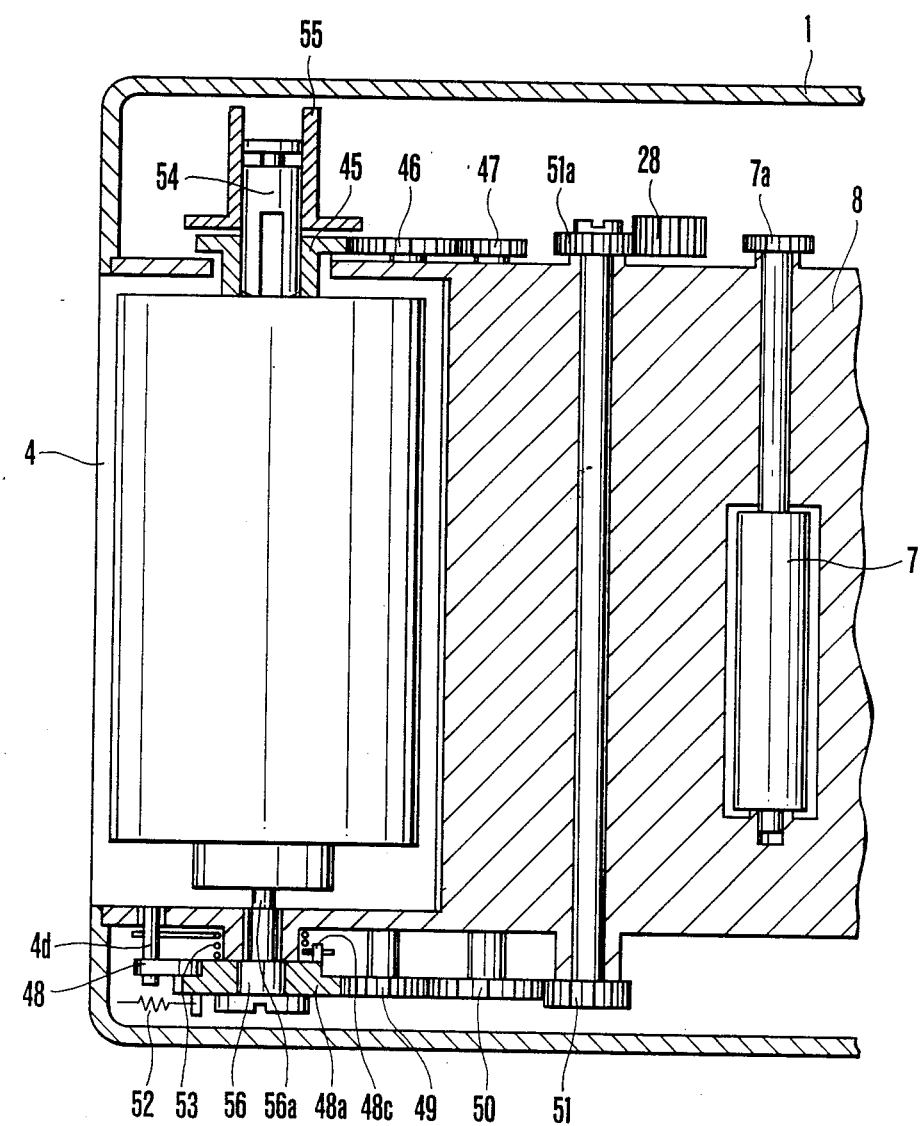
FIG. 4 is a vertical section view of the cartridge chamber and associated parts therewith in the camera of FIG. 1.

FIG. 4 in lateral, vertical section view shows the arrangement of those parts which lie near the cartridge chamber 8c, where the like parts to those shown in FIG. 3 are denoted by the same reference numerals. The rewind fork 54 is rotatably mounted in a holder 55 and engages the fork gear 45 of FIG. 3 in key-and-groove connection, so that it is axially movable relative to the fork gear 45, and driven to rotate as the fork gear 45 rotates. The axial position of the rewind fork 54 is controlled in accordance with the angular position of the lid 4 by a mechanism (not shown) known in the art so that when the lid 4 is opened, it is retracted into the holder 55, and when half closed, it starts to enter the hub of the cartridge P.

A shaft 56 on which the charge disc 48 is rotatably mounted has its upper end 56a passing through the framework 8 to serve as the lower stub for rotation of the lid 4 in axial alignment to the rewind fork 54. The outer diameter of the collar of the fork gear 45 serves as the upper stub for rotation of the lid 4 in axial alignment to the rewind fork 54.

Figure 5:
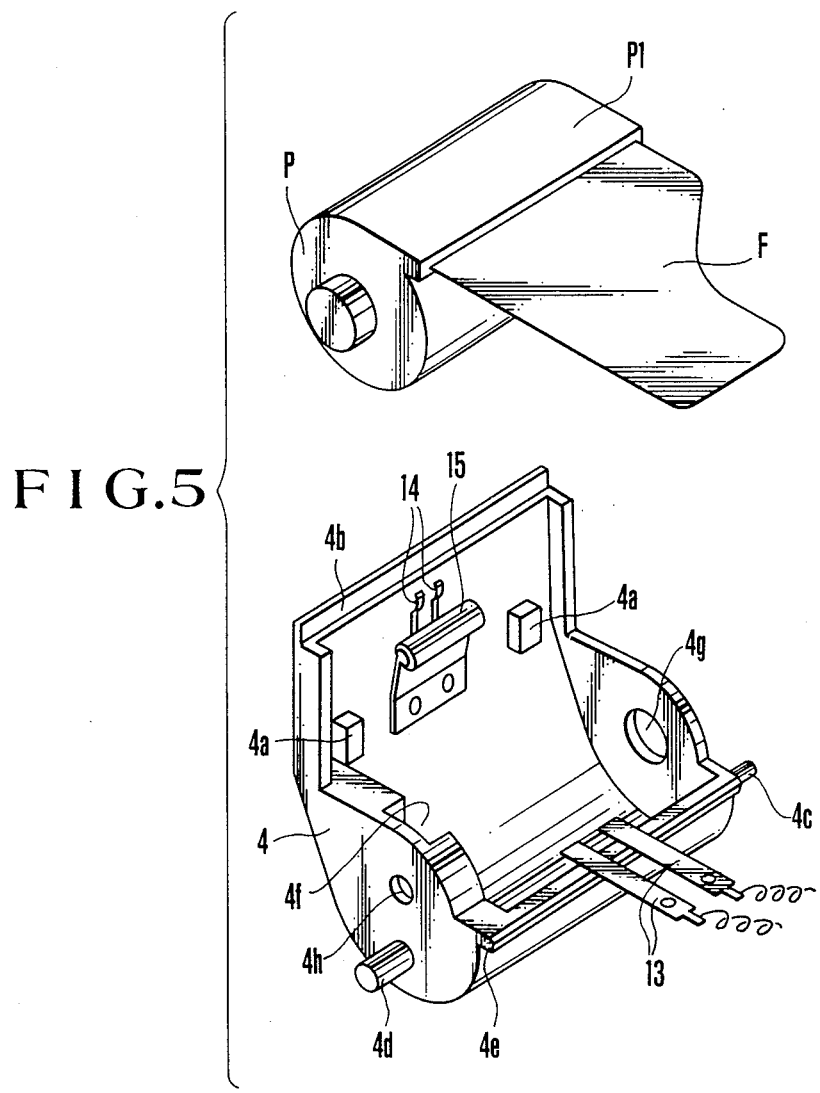
FIG. 5 is a perspective view illustrating the construction of the chamber lid of the camera of FIG. 1.
Figure 6:
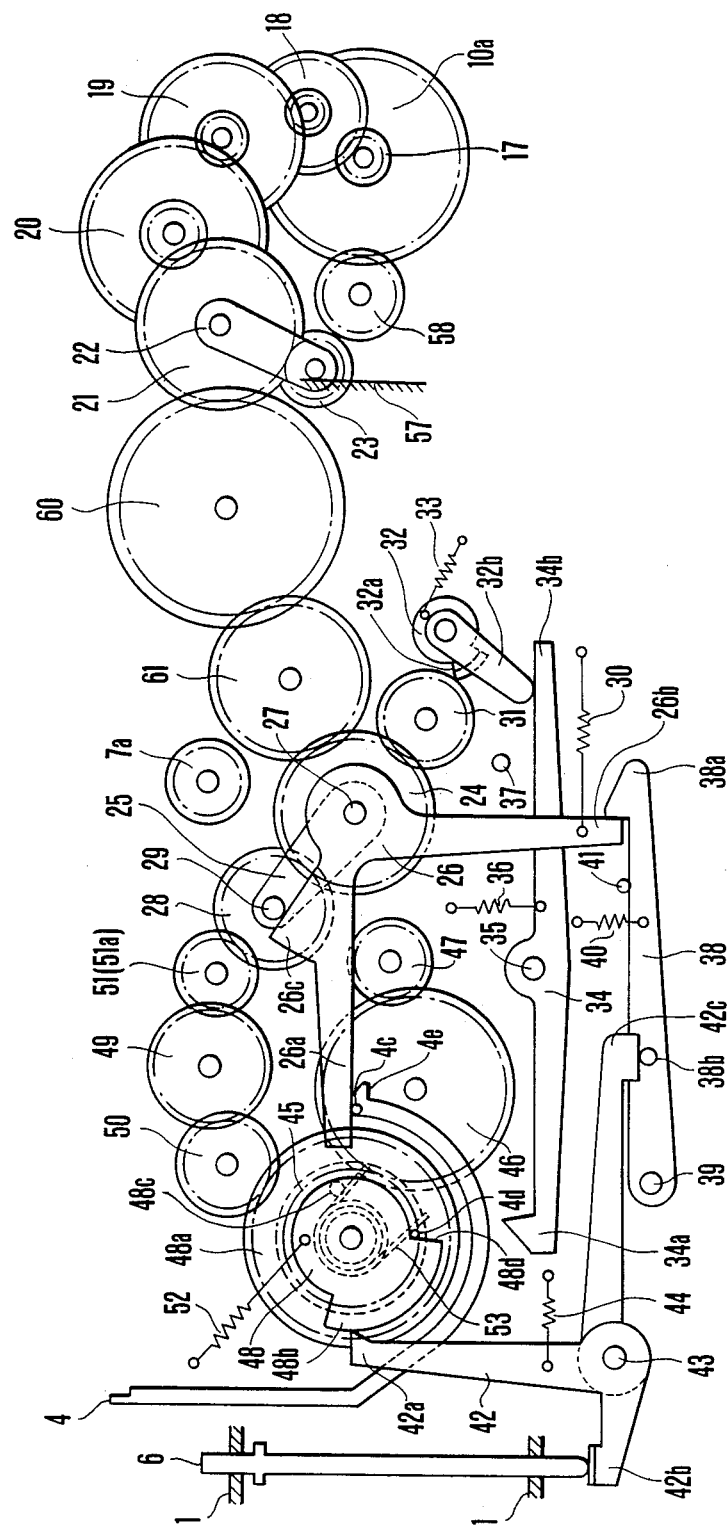
FIG. 6 is a top view of the gears of the camera of FIG. 1 in an operative position just after the start button has been pushed down.
Figure 7:
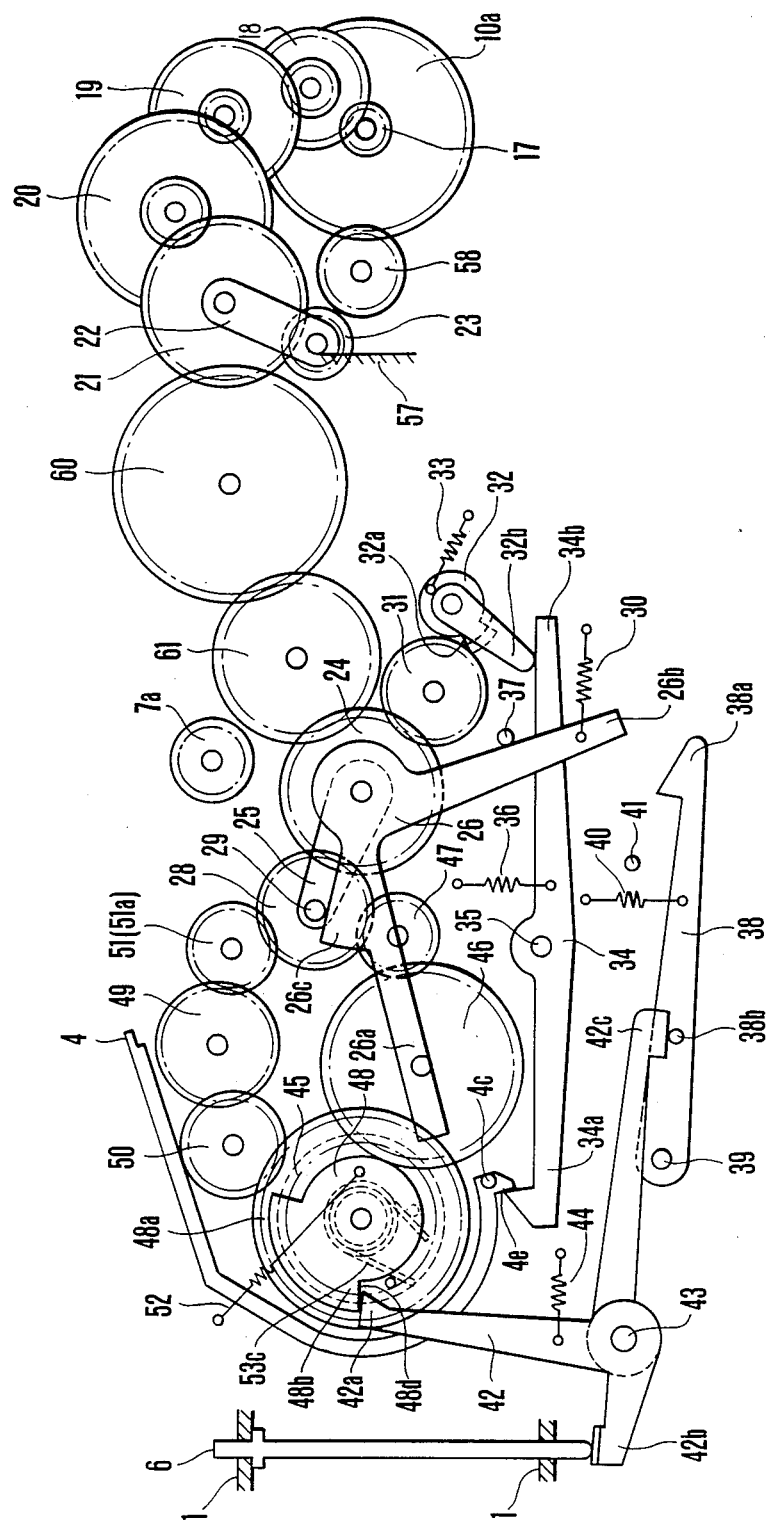

FIG. 5 in perspective view shows the details of the lid 4 in relation to the cartridge P. The lid 4 is formed to such a shape as extending from the periphery of a semicylinder. Besides the cartridge push protuberances 4a, the light-tight shielding step-down portion 4b and the pins 4c and 4d, there are an extension 4e, a recess 4f of escapement from the lower hub of the cartridge P, and upper and lower holes 4g and 4h for rotation, these parts being formed in unison with the lid 4. One pair of electrically conductive contacts 14 of the film leader detection switch and the film, presser roller 15 are also mounted on the lid 4. Reference numeral 13 represents the opposite pair of contacts of the film leader detection switch which are mounted on the housing 1.

Figure 9:
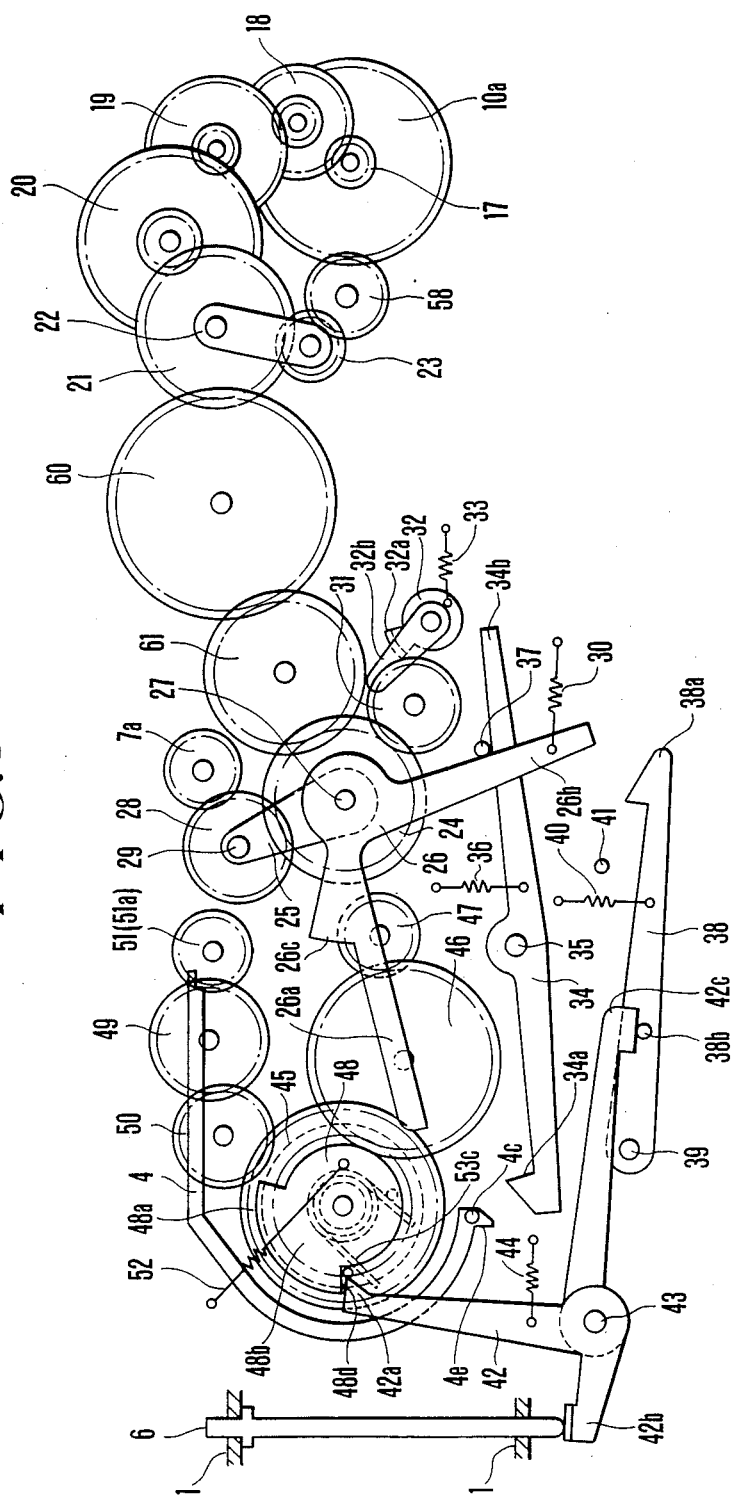
FIG. 9 is similar to FIG. 6 except when the film leader is fed to the takeup spool under the condition that the chamber lid is totally closed.
Figure 10:
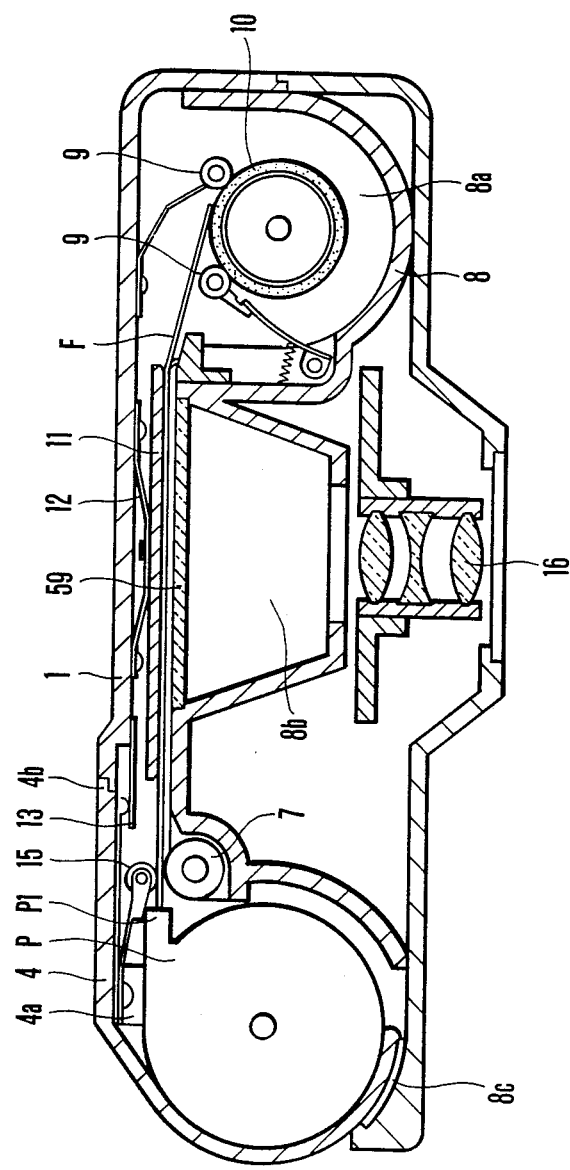
FIG. 10 is a cross-sectional view of the camera of FIG. 1 in the operative position of FIG. 9.
Figure 11:
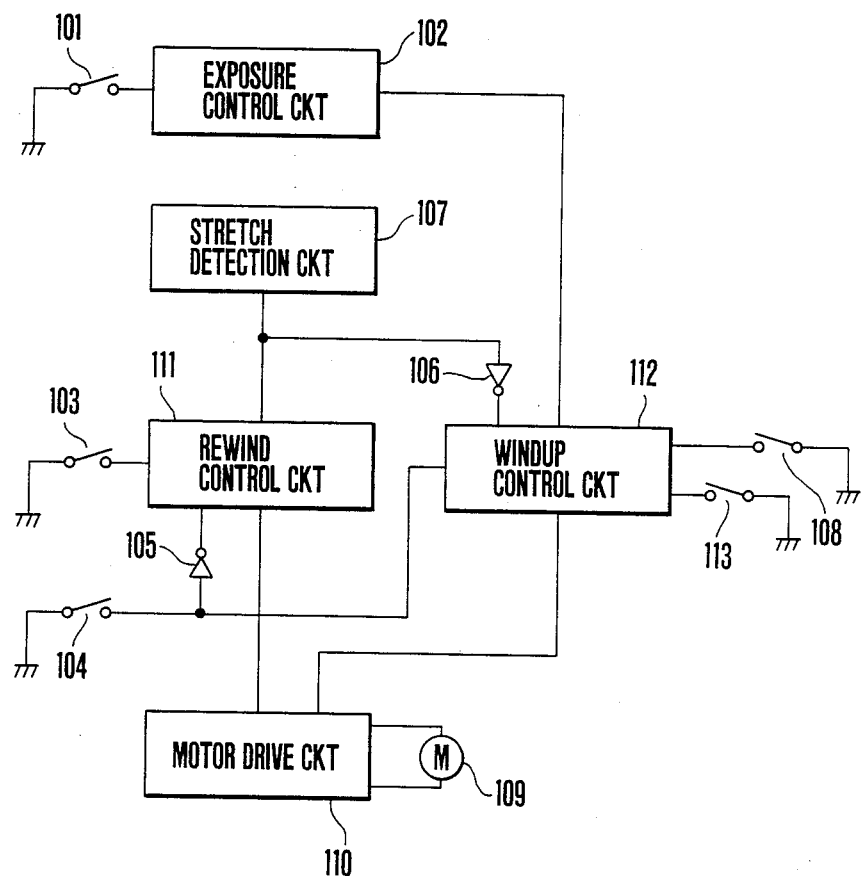
FIG. 11 is a block diagram illustrating a control circuit of the camera of FIG. 1.

FIG. 11 is an electrical circuit diagram, partly in block form, of controlling the camera of FIGS. 1 to 10. A release switch 101 is arranged to be closed when the release button 3 of FIG. 1 is pushed down. Responsive to closure of the release switch 101, a publicly known exposure control circuit 102 performs an exposure operation. A start switch 103 is arranged to be closed when the start button 6 of FIG. 1 is pushed down. The film leader detection switch 104 comprised of the pairs of contacts 13 and 14 shown in FIG. 2 cooperates with the film leader F in such a manner that as the film leader is in protrusion outwardly of the the camera, because the film intervenes between the pairs of contacts 13 and 14, it is turned off, and when the film leader F is fully pulled in from the outside of the camera, the pairs of contacts 13 and 14 come into contact with each other, that is, it turns on. Inverters 105 and 106 produce outputs of the opposite sign to that of the input signals applied thereto. As the film has all been exposed, when it is stretched, a stretch detection circuit 107 produces an output signal. A transport switch 108 turns on and off repeatedly as the film is advancing. An electric motor 109 to which the pinion of FIG. 3 is fixedly mounted is used as the electric drive means. A publicly known motor drive circuit 110 controls the direction of rotation of the motor 109. A publicly known rewind control circuit 111 controls the rewinding operation of the film in such a manner that when the start switch 103 is closed under the condition that that output of the inverter 105 which represents the opening of the film leader detection switch 104 is inputted, or when the stretch detection circuit 107 detects the occurrence of a stretch, it produces an actuating signal which is applied to the motor drive circuit 110, thus initiating the rewinding operation. The winding-up of the film is controlled by a windup control circuit 112 known in the art. Responsive to closure of the film leader detection circuit 104, or simultaneous occurrence of that output signal from the exposure control circuit 102 which represents the termination of the exposure, and that output signal from the stretch detection circuit 107 which represents that the film is not stretched yet, the windup control circuit 112 produces an output signal which is applied to the motor drive circuit 110, thus initiating the winding up operation. As the film is advancing, the transport switch 108 turns on and off repeatedly. When the number of cycles of on-off operation of the switch 108 reaches a level for the predetermined blank advance or one-frame advance, the circuit 112 terminates the winding up operation. A film presence-absence switch 113 detects when the rewinding of the film into the cartridge has ended.

The operation of the camera of such construction is next described by reference to FIGS. 1 to 11. It should be noted that FIGS. 6 to 10 are given to explain the different operative positions of the camera from that shown in FIGS. 1 to 5, and, therefore, employ the same reference characters to denote the like parts.

At first, the lid 4 is opened as shown in FIG. 2, and the cartridge P is inserted into the chamber 8c. At this time, in the conventional camera, the cartridge P would be oriented with the film pullout mouth $P_1$ in parallel with the exposure aperture 8b (so that the film leader is in parallel with the aperture plane or glass plate 59), but according to this embodiment, because the lid 4 turns about the common axis of rotation of the rewind fork, without having to be concerned with the direction the mouth $P_1$ orients, the user may put the cartridge P into the chamber. Even if the mouth $P_1$ is not pointed to the film gate as indicated by $P_2$ in FIG. 2, the subsequent operation will go well. It should also be noted that when the cartridge P is seated in the chamber as shown in FIG. 2, all the gears and levers take their initial positions shown in FIG. 3.

Then, when the start button 5 is depressed, the start switch 103 of FIG. 11 is closed. Since at this time the pairs of contacts are not in contact as indicated in FIG. 2, or the film leader detection switch 104 of FIG. 11 is off, because its output is applied through the inverter 105 to the rewind control circuit 111, the latter gives the motor drive circuit 110 a signal for rotating the motor 109 in the film rewind direction. Thereby, the motor 109 stars to rotate in the normal direction. Clockwise motion of the pinion gear 17 as viewed in FIG. 3 is transmitted through the speed reduction gears 18–20 to rotate the first sun gear 21 also in the clockwise direction. The first planet gear 23 then moves away from the intermediate gear 58, and stops when the shaft of the planet gear 23 abuts on the stopper 57 (in the position of FIG. 6). Also, the second sun gear 24 rotates in the counterclockwise direction as is driven through the intermediate gears 60 and 61, causing the second planet lever 25 to rotate in the same direction until its shaft 29 contacts with the arrest portion 26c of the crank lever 26. Since at this state the second planet gear 28 engages with the second input upper gear 51a, the driving torque from the second input lower gear 51 is transmitted through the intermediate gears 49 and 50 to the charge gear 48a. Clockwise movement of the charge gear 48a causes the charge disc 48 to rotate in the same direction against the spring 52, which in turn causes the absorption spring 53 to push the pin 4d on the lid 4. Hence the lid 4 starts to rotate about the concentric axis to the axis of rotation of the rewind fork in the closing direction. During this time, even if the pullout mouth P$_2$ of the cartridge P is oriented as floating up outwardly of the chamber as shown in FIG. 2, the protuberance 4a of the lid 4 then acts on the cartridge P, bringing the mouth P$_2$ into parallelism with the aperture plane. Thus, the orientation of the mouth of the cartridge P is automatically corrected. Further, even if the moving lid 4 is abruptly stopped by the user's finger, or matter hemmed in, the absorption spring 53 between the lid 4 and the charge disc 48 allows the latter to continue rotating without causing the motor and the gear trains to be destroyed.

Figure 8:
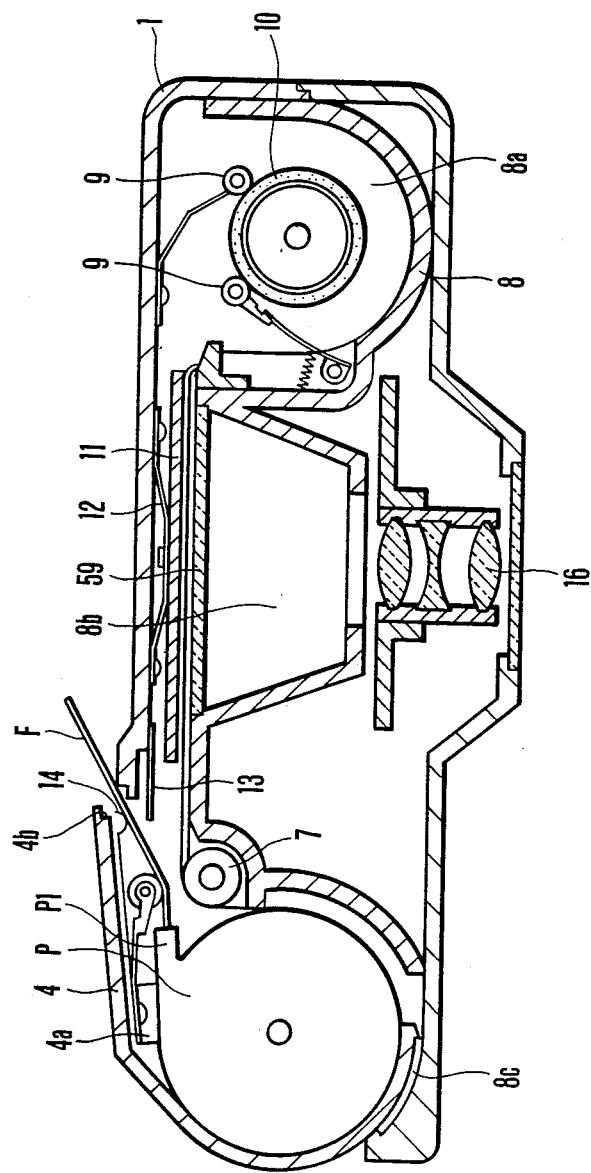
FIG. 8 is a cross-sectional view of the camera of FIG. 1 in the position of FIG. 7.

Counterclockwise movement of the second sun gear 24 is transmitted through the intermediate gear 31 to rotate the cam gear 32 in the counterclockwise direction. Since, however, the cam gear 32 is toothed only in part of the entire periphery, it stops at such a position that the charge cam 32b moves and holds the latch lever 34 in engagement with the arm 34b in the clockwise direction to and in a certain angular position shown in FIG. 6. Because in this position the latch lever pawl 34a becomes engageable with the extension 4e of the lid 4, when the lid 4 has rotated some angle, the extension 4e and the pawl 34a engage with each other. Thus, the lid 4 is stopped half open. Meanwhile, the charge disc 48 further rotates while charging the absorption spring 53. When the charge disc 48 has rotated to a predetermined angle, the pawl 42a of the lock lever 42 drops from the large diameter portion 48b of the charge disc 48 and enters beneath the shoulder 48d. Therefore, the charge disc 48 is prevented from later returning to the counterclockwise direction. Such dropping or clockwise movement of the lock lever 42 also causes the hook lever 38 to rotate clockwise in the arm 42c-and-pin 38b connection until the hook 38a disengages from the crank lever 26. Thereupon, the crank lever 26 turns in the counterclockwise direction by the spring 30. Thus, the shaft 29 of the second planet lever 28 is released from the arresting connection to bring the second planet gear 28 into engagement with the first input gear 47 (in the position of FIG. 7). Therefore, the rotation of the motor is transmitted from the first input gear 47 through the intermediate gear 46 to the fork gear 45. The fork gear 45 shown in FIG. 4 is then rotated in the rewind direction. Since, in this lid half open state, the fork has already downed and engaged the hub of the cartridge P, the film leader F lying outside the camera starts to be pulled in. The situation of this time is shown in FIG. 8 also. Up to this state, the contacts 14 of the film leader detection switch are in contact with the film and cannot touch the opposite contacts 13 yet. As the pulling-in of the film leader F goes on, when the tip of the film leader F moves away from the contacts 14, or the pulling-in operation is completed, the contacts 14 touch the opposite contacts 13. Thereby the film leader detection switch 104 turns on. This signal is applied through the inverter 105 to the rewind control circuit 111. Responsive to this, the rewind control circuit 111 gives the motor drive circuit 110 a signal for stopping the rotation of the rewind direction of the motor 109. Meanwhile, the "on" signal of the film leader detection switch 104 is given also to the windup control circuit 112. The windup control circuit 112 then produces an output signal for rotating the motor 109 in the windup direction which is applied to the motor drive circuit 110. By this, the rotation of the motor 109 is reversed. Hence the pinion 17 of FIG. 7 starts to rotate in the counterclockwise direction. By the clockwise movement of the pinion 17, the second sun gear 24 is rotated in the clockwise direction, the second planet gear 28 is engaged with the gear 7a, and the transport roller 7 of FIG. 2 is rotated so as to feed the film toward the aperture 8b. Also because the sun gear 21 too changes its rotation to the counterclockwise direction, the spool gear 10a is rotated through the intermediate gear 58. Thus, the spool 10 of FIG. 2 also starts to rotate in the film takeup direction. The clockwise movement of the second sun gear 24 is transmitted through the intermediate gear 31 to rotate the cam gear 32 too in the clockwise direction, disengaging the cam 32b from the arm 34b of the latch lever 34. This permits the latch lever 34 to turn in the counterclockwise direction by the spring 3, taking the pawl 34a out of engagement with the extension 4e of the lid 4. Therefore, the lid 4 becomes free and is rotated by the absorption spring 53 acting on the pin 4d until it reaches the totally closing position. In short, the lid 4 is totally closed by the reverse rotation of the motor 109. This position is shown in FIGS. 9 and 10 where the light-shielding stepped-down portion 4b of the lid 4 fits on the opposedly stepped-down portion of the housing 1 to prevent light from leaking into the closed chamber. Also, the roller 15 is pressed against the transport roller 7 with the film leader F therebetween. Hence the film can be pulled out from the cartridge P to the aperture 8b. The film leader F can pass across the aperture 8b without suffering from being trapped therein, because there is the glass plate 59. When the film leader F enters the spool chamber 8a, the film guide rollers 9 bring it into convolution on the spool 10. In response to movement of the film, the transport switch 108 of FIG. 11 repeats its on-off operation. The windup control circuit 112 counts the number of cycles of this on-off operation. When the film has advanced by the predetermined number of blank frames, the windup control circuit 112 signals the motor drive circuit 110 to stop the motor 109. Thus, the loading operation is completed.

After that, when the release button 3 is pushed down, the release switch 101 of FIG. 11 is closed and an exposure operation is carried out by the exposure control circuit 102. When the exposure operation terminates, a start signal for advancing the film one frame is sent from the exposure control circuit 102 to the windup control circuit 112. Responsive to this, the windup control circuit 112 supplies a signal to the motor drive circuit 110 to rotate the motor 109 in the windup direction. The windup control circuit 112 counts cycles of the on-off operation of the transport switch 108. When it detects that the film has been advanced through the length of one frame, the motor drive circuit 110 stops the motor 109. Thus, one cycle of film winding operation terminates.

In such a manner, the exposure operation followed by the one-frame winding up operation of the film is repeated. As the cartridge P can feed no more fresh area of the film, when the stretch detection circuit 111 detects a stretching of the film in the last film winding operation, it produces an output signal which is applied through the inverter 106 to the rewind control circuit 112. Upon reception of this signal, the windup control circuit 112 supplies a signal to the motor drive circuit 110 so that the rotation of the windup direction of the motor 109 is stopped. Meanwhile, the stretch detection signal from the stretch detection circuit 107 is applied to the rewind control circuit 111 too. Upon reception of this signal, the rewind control circuit 111 supplies a signal to the motor drive circuit 110 so that the motor 109 is rotated to the rewind direction. Thereby, the motor 109 starts to rotate again in the normal direction. The pinion 17 of FIG. 9 rotates clockwise. Since the crank lever 26 is in the retracted position, clockwise movement of the pinion 17 brings the second planet gear 28 into engagement with the first input gear 47. Hence the rotation of the motor 109 is transmitted again to the rewind fork 54 of FIG. 4, thus initiating a rewinding operation. Though at this time the latch lever 34 moves, no particular influence is given to the others. And, when the film is all rewound into the cartridge P, the film presence-absence switch 113 produces an output signal. Responsive to this, the windup control circuit 112 supplies a signal to the motor drive circuit 110 to rotate the motor 109 in the reversed direction for a short time. The resultant position is shown in FIG. 9. Then, when the open button 6 is pushed in, the lock lever 42 is turned counterclockwise in engagement at the arm 42b, whereby the pawl 42a is disengaged from the shoulder 48d of the charge disc 48 to permit counterclockwise movement of the charge disc 48 under the action of the spring 52. The charge disc 48 then pushes the pin 4d, opening the lid 4 to about 90° as shown in FIG. 3. Thus, the user can take the cartridge P out. Also, during the time when the lid 4 opens, its pin 4c engages the crank lever arm 26a and returns the crank lever 26 to the initial position of FIG. 3. Therefore, the other arm 26b of the crank lever 26 is set again by the hook lever 38. And, in this state, the latch lever 34 is out of engagement with the cam 32b of the cam gear 32. Therefore, its pawl 34a lies outside the path of movement of the extension 4e of the lid 4. Accordingly, after the cartridge P has been removed from the chamber 8c, as the user intends to close the lid 4 by hand, it can be done so while moving the charge disc 48. The lock lever pawl 42a catches the charge disc 48 at the shoulder 48d. Thus, the lid 4 is manually set in the closing state. Though at this time the intermediate gears 49 and 50, the second input gear 51, etc. simultaneously rotate, they do not become a load because the second planet gear 28 is out of mesh.

Figure 12:
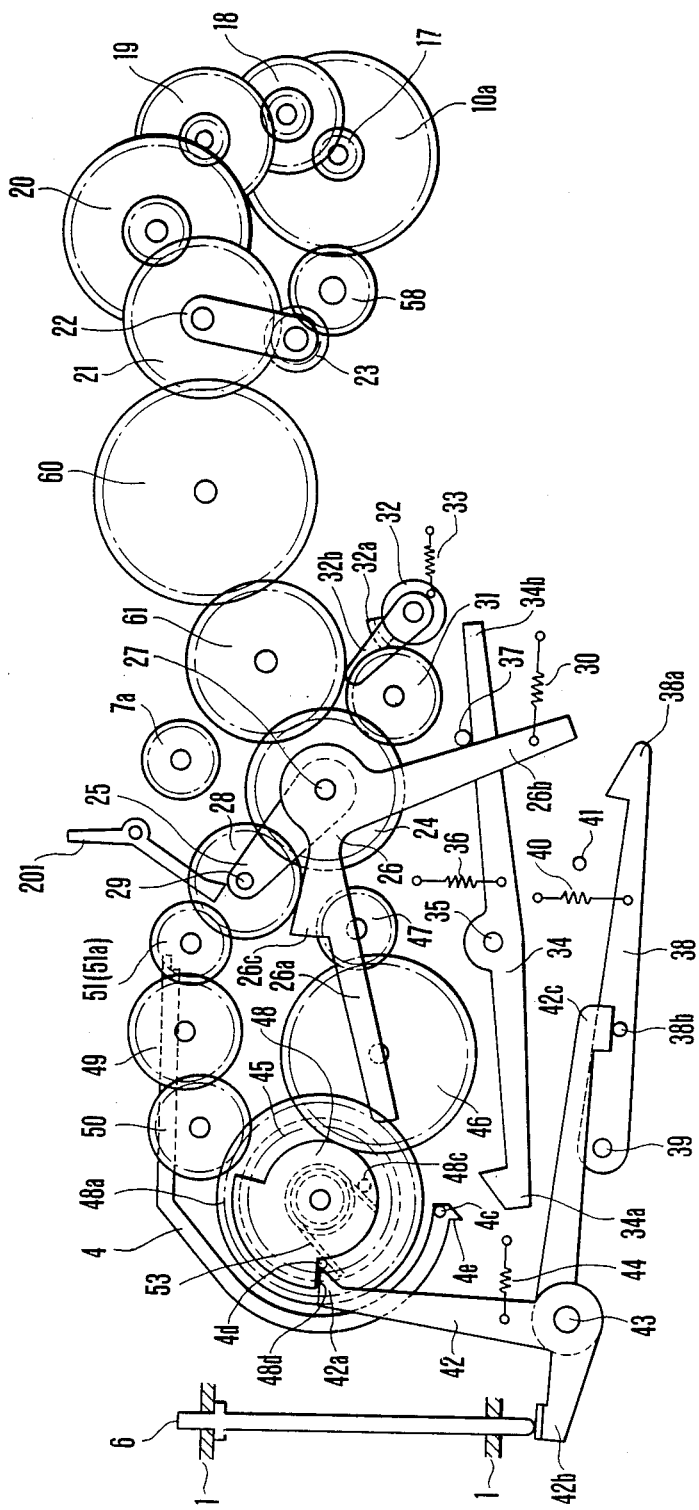
FIG. 12 is similar to FIG. 3 except that an example of variation of some of the parts is illustrated.
Figure 13:
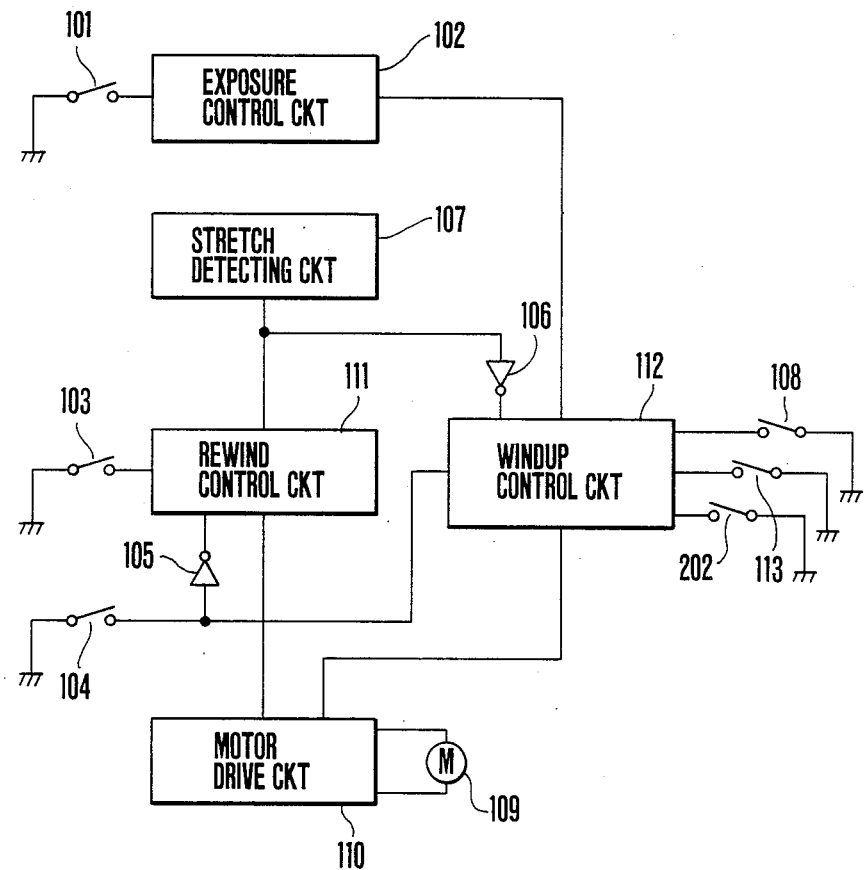
FIG. 13 is an electrical circuit diagram, partly in block form, of the example of variation of FIG. 12.

Though in the foregoing embodiment the opening operation of the lid 4 is performed by the bias force of the return spring 52, this may otherwise be done by the driving power of the motor. For this case, as shown in FIG. 12, the return spring 52 is omitted from the structure of FIG. 3 and a lock lever 201 is added as arranged upon movement of the open button 6 to hold the second planet gear 28 in meshing relation to the second input gear 51. Also, as shown in FIG. 13, the circuit of FIG. 11 is modified so that even when the film presence-absence switch 113 detects that the film has all been rewound into the cartridge P, the motor 109 is made not to rotate in the reverse direction Along with this, an open switch 202 is added as arranged to rotate the motor in the windup direction when the open button 6 is pushed down.

With such a structure, after the rewinding of the film is complete, when the open button 6 is pushed down, the second lock lever 201 enters the range of movement of the second planet lever 25. At the same time, the first lock lever 42 is pushed by the open button 6 to turn counterclockwise, releasing the charge disc 48 from the locking connection. Meanwhile, the open switch 202 is turned on in response to depression of the open button 6, thereby the windup control circuit 112 signals the motor drive circuit 110 to rotate the motor 109 in the windup direction. By this, the second planet gear 28 is urged to move toward the gear 7a, but its movement is hindered by the second lock lever 201. Hence its revolution is stopped under the condition that it is in mesh with the second input gear 51. Because it is in this state that the motor rotates in the windup direction, the charge gear 48a is rotated in the counterclockwise direction by the second planet gear 28 through the first input gear 51 and intermediate gears 49 and 50. The pin 4d of the lid 4 is then pushed by the shoulder 48d of the large diameter portion 48b of the charge disc 48. Thus, the lid 4 is opened automatically.

It should be noted that it is desired to automatically stop this opening operation of the lid 4, a discrimination switch which is responsive to the operation of the crank lever 26, etc. may be used so that the motor is stopped by the signal of this discrimination signal.

Also, though in the foregoing embodiment the closing operation of the lid is performed by the driving power of the motor and the opening operation by the bias force of the spring, this relation may be reversed or the closing operation may be performed by the bias force of a spring, and the opening operation by using the driving power of the motor.

Also, though in the foregoing embodiment the the motorized driving power for the lid is obtained from the film transport motor, another motor may be used for driving the lid.

Further though in the foregoing embodiment the lid 4 when closed by the motor or by hand is not directly locked but instead the locking is effected on the charge disc 48, leaving the lid held only by the absorption spring 53, means may be provided for directly locking the lid in the closing position so that the film is protected against fogging with a higher reliability. For this case, this means is arranged so that the lid is released from the locking connection in response to depression of the open button 6.

Also, the cartridge chamber and the spool chamber in the foregoing embodiment may be exchanged with each other with an advantage that the lid is formed into a finger grip.

Another embodiment of the invention is next described.

A different point of the embodiment from the foregoing embodiment is that whilst in the foregoing embodiment, after the cartridge has been inserted into the chamber, the start button 5 must be pushed to activate the motor for the purpose of pulling the film leader in before the camera is ready to shoot, it is in this embodiment that this is removed and instead the user needs only to manually stimulate the lid to move in the closing direction when the above-described motor is activated.

In the following, the description of this embodiment is made, for the purpose of simplicity, only in connection with the different features from those of the foregoing embodiment, and those features which will not be described below are assumed to be identical to the ones of the foregoing embodiment. Also, in the drawings of this embodiment, the like parts to those of the foregoing embodiment are denoted by the same reference characters.

Figure 14:
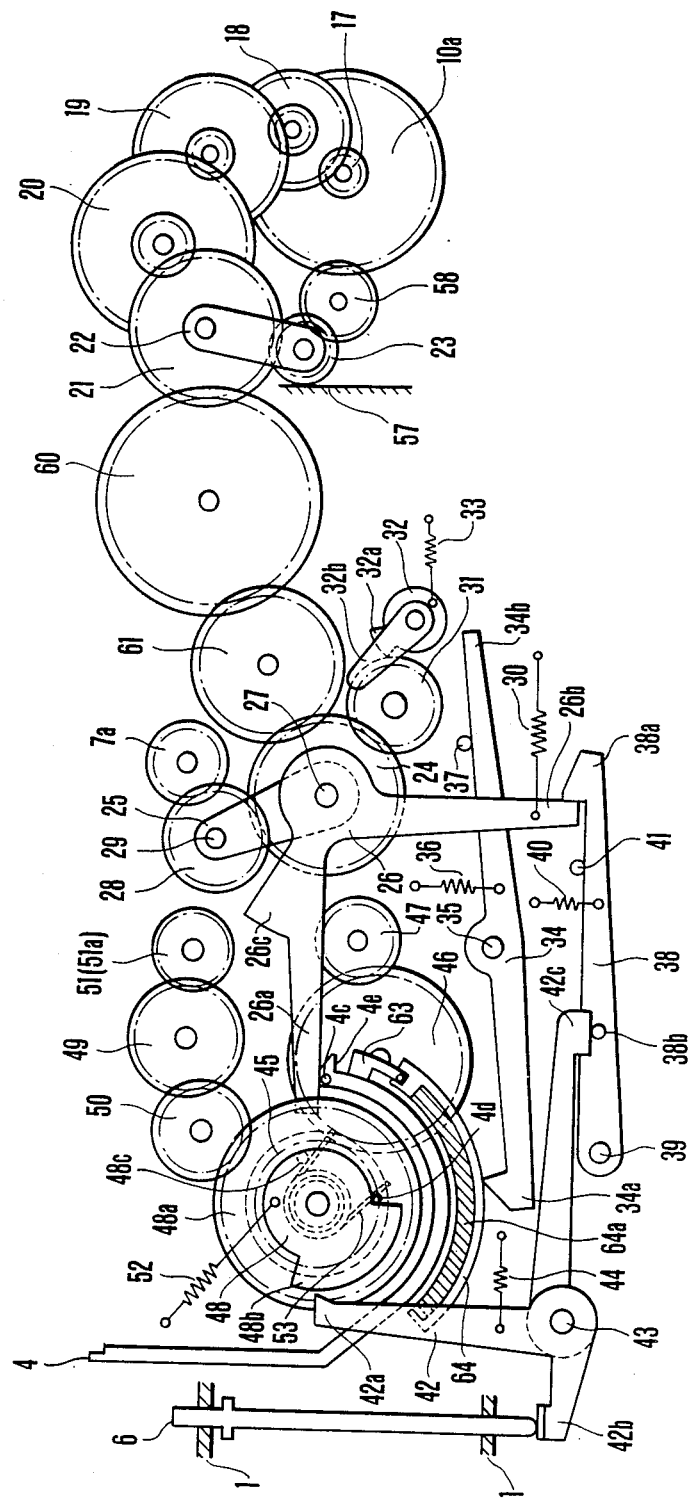
FIG. 14 is similar to FIG. 3 except that another embodiment of the invention is illustrated.

FIG. 14 in top view shows a corresponding gear arrangement of a camera of this embodiment to that of FIG. 3 of the foregoing embodiment. In FIG. 14, a slider 63 of the above-described start switch rides on an arcuate stripe of copper foil 64a on a substrate 64. When the lid 4 is fully open as shown in the drawing, the slider 63 lies beyond the copper foil stripe 64a. But when the lid 4 is slightly moved toward the closing position, the slider 63 contacts with it. These parts or the slider 63 and the copper foil stripe 64a are electrically connected to a control circuit to be described below.

Figure 15:
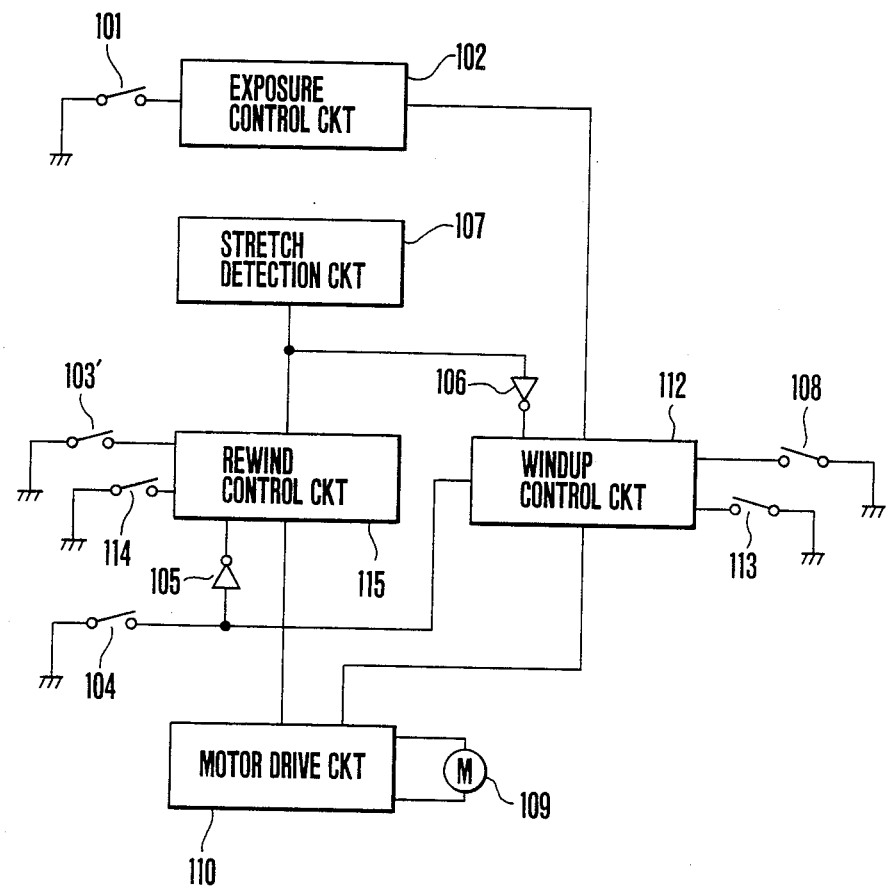
FIG. 15 is a block diagram of a control circuit in the FIG. 14 embodiment of the camera.

FIG. 15 in block diagram shows a corresponding control circuit of this embodiment to that of FIG. 11 of the foregoing embodiment. A start switch 103' has the same function as that of the start switch 103 of the foregoing embodiment, but is different from the latter in that it is closed when the slider 63 and the copper foil stripe 64a of FIG. 14 contact with each other. Reference numeral 114 represents a cartridge detection switch for detecting when the cartridge P has been seated in the cartridge chamber 8c. 115 is a publicly known rewind control circuit for controlling the rewinding of the film. When the start switch 103' is closed under the conditions that the cartridge detection switch 114 detects that the cartridge P has been seated in the chamber 8c and the the inverter 105 produces the output representing that the film leader detection switch 104 is in "off" state, or when the stretch detection circuit 107 has detected occurrence of a stretching, it produces an output signal which is applied to the motor drive circuit 110 to initiate a rewinding operation.

In operating such a mechanism, after having inserted the cartridge P in the chamber, the user slightly moves the lid 4 from the position of FIG. 4 to the closing (clockwise as viewed in FIG. 14) direction. Thereupon, the slider 63 starts to contact with the copper foil stripe 64a, or the start switch 103' of FIG. 15 turns on. At this time, the cartridge detection switch 114 is producing the output representing that the cartridge P has been seated in the chamber 8c, and further, similarly to the foregoing embodiment, the contacts 13 and 14 are not in contact with each other, or the inverter 104 is producing the output representing that the film leader detection switch 104 remains off. Responsive to these signals, the rewind control circuit 115 gives the motor drive circuit 110 a signal for rotating the motor 109 in the film rewind direction. By this, the motor 109 starts to rotate in the normal direction along with the pinion 17 which rotates in the clockwise direction as viewed in FIG. 14.

The subsequent operation is similar to that of the foregoing embodiment, where the film is first fed back by the driving power of the motor 109 into the cartridge P until the film leader F is fully pulled in the camera, and then fed forward until it is connected to the takeup spool. Thus, the camera is made ready to shoot a first frame.

In connection with this embodiment it should be noted that since the lid 4 when manually pushed to close actuates the start switch 103', it appears to function like the start button of the foregoing embodiment, but in the case when the cartridge chamber is empty, it never occurs that an unintentional touch of the user's hand on the lid 4 causes the rewind control circuit 115 to start motion of the motor, because the cartridge detection switch 114 is provided for detecting the absence of the cartridge.

Though this embodiment has been described in connection with such an arrangement of the cartridge detection switch 114 that when no cartridge is seated in the cartridge chamber, the lid 4 is not closed by the motor, the arrangement may be varied so that regardless of whether or not the cartridge chamber is occupied by the cartridge, (or, independently of whatever state the cartridge detection switch 114 takes), the closing operation of the lid 4 is always motorized.

What is claimed is:

1. A camera capable, upon insertion of a film cartridge having a leader of film outside the cartridge into a cartridge chamber of the camera leaving said leader outside the camera, of feeding said leader first backward into the interior of the camera and then forward to a film takeup spool of the camera, comprising:
   (A) closing means for closing said cartridge chamber;
   (B) transport means for transporting said film; and
   (C) operating means for operating said closing means by a driving power of said transport means.

2. A camera according to claim 1, wherein said closing means includes an opening and closing lid for said cartridge chamber.

3. A camera according to claim 1, wherein said transport means includes a motor.

4. A camera according to claim 1, wherein said operating means includes means for causing said closing means to perform a closing operation.

5. A camera according to claim 4, further comprising:
   an elastic member for causing said closing means to perform an opening operation.

6. A camera according to claim 1, further comprising:
   absorption means for absorbing the driving power from said transport means when said closing means receives a stopping force, while said transport means is driving said closing means.

7. A camera according to claim 6, wherein said absorption means includes an elastic member.

8. A camera according to claim 1, further comprising:
   (D) determining means for determining when the backward feeding of said film leader into the interior of the camera is completed; and
   (E) control means, responsive to completion of the backward feeding determined by said determining means, for causing said closing means to totally close.

9. A camera according to claim 1, further comprising:
start means for causing initiation of an operation of said operating means said start means being operated from the outside of said camera.

10. A camera according to claim 1, wherein said operating means includes switching-on means for causing said closing means to perform a closing operation.

11. A camera according to claim 10, further comprising:
start means for causing initiation of an operation of said switching-on means
said start means being operated by moving said closing means in the closing direction.

12. A camera according to claim 1, further comprising:
release means for cutting off a path of transmission of the driving power from said transport means to said closing means in a state that said closing means is open.

13. A camera according to claim 1, further comprising:
rotary means for causing said closing means to rotate almost concentrically to the center of rotation of a fork for transmitting a rotative driving power to said cartridge so that said closing means is caused to perform a closing operation.

14. A camera according to claim 1, further comprising:
absorption means for absorbing the driving power from said motor when said closing means receives a stopping force, while said motor is driving said closing means.

15. A camera according to claim 14, wherein said absorption means includes an elastic member.

16. A camera according to claim 1, wherein said operating means comprises means for causing said closing means to perform an opening operation.

17. A camera capable, upon insertion of a film cartridge having a leader of film outside the cartridge into a cartridge chamber of the camera leaving said film leader outside the camera, of feeding said film leader first backward into the interior of the camera and then forward to a takeup spool of the camera, comprising:
(A) closing means for closing said cartridge chamber;
(B) an; and
(C) operating means for operating said closing means by a driving power of said motor.

18. A camera according to claim 17, wherein said operating means comprises means for closing said closing means to perform a closing operation.

19. A camera according to claim 17, wherein said operating means comprises means for causing said closing means to perform an opening operation.

20. A camera according to claim 19, wherein said control means includes means for prohibiting said motor from being energized when said cartridge is not seated in said cartridge chamber.

21. A camera capable, upon insertion of a film cartridge having a leader of film outside the cartridge into a cartridge chamber of the camera leaving said leader outside the camera, of feeding said leader first backward into the interior of the camera and then forward to a takeup spool of the camera, comprising:
(A) closing means for closing said cartridge chamber;

(B) determining means for determining when the backward feeding of said film leader into the interior of the camera is completed; and
(C) control means, responsive to completion of the backward feeding determined by said determining means, for causing said closing means to totally close, wherein said control means includes an electric motor for driving said closing means.

22. A camera capable, upon insertion of a film cartridge having a leader of film outside the cartridge into a cartridge chamber of the camera leaving said leader outside the camera, of feeding said leader first backward into the interior of the camera and then forward to a takeup spool of the camera, comprising:
(A) closing means for closing said cartridge chamber;
(B) a motor for driving said closing means to close; and
(C) control means, responsive to a movement of said closing means from an open position to a closing direction, for energizing said motor.

23. A camera capable, upon insertion of a film cartridge having a leader of film outside the cartridge into a cartridge chamber of the camera leaving said leader outside the camera, of feeding said leader first backward into the interior of the camera and then forward to a takeup spool of the camera, comprising:
(A) closing means for closing said cartridge chamber;
(B) drive means for driving said closing means to close; and
(C) release means for cutting off the connection between said closing means and said drive means in a state that said closing means is fully open.

24. A camera according to claim 23, wherein said drive means include a electric motor.

25. A camera capable, upon insertion of a film cartridge having a leader of film outside the cartridge into a cartridge chamber of the camera leaving said leader outside the camera, of feeding said leader first backward into the interior of the camera and then forward to a takeup spool of the camera, comprising:
(A) closing means for closing said cartridge chamber; and
(B) rotary means for causing said closing means to rotate almost concentrically to the center of rotation of a fork for transmitting a rotative driving power to said cartridge so that said closing means is caused to perform a closing operation.

26. A camera according to claim 25, further comprising:
a motor for driving said closing means.

27. A camera comprising:
(A) a cartridge chamber for loading therein a film cartridge containing a film;
(B) closing means for closing said cartridge chamber;
(C) transport means for transporting said film; and
(D) operating means for operating said closing means by a driving power of said transport means.

28. A camera according to claim 27, wherein said transport means includes a motor.

29. A camera according to claim 27, further comprising means for manually operating said closing means.

30. A camera according to claim 27, further comprising:
an elastic member for causing said closing means to perform an opening operation.

31. A camera according to claim 27, wherein said operating means includes a switching means for causing said closing means to perform a closing operation.

32. A camera according to claim 31, further comprising:
start means for initiating of an operation of said switching means, said start means being operated by manually moving said closing means in the closing direction.

33. A camera according to claim 27, further comprising:
release means for cutting off the driving power from said transport means to said closing means when said closing means is open.

34. A camera according to claim 27, wherein said operating means comprises means for closing said closing means to perform a closing operation.

35. A camera according to claim 27, wherein said operating means comprises means for causing said closing means to perform an opening operation.

36. A camera comprising:
(A) a cartridge chamber for loading therein a film cartridge containing a film;
(B) closing means for closing said cartridge chamber;
(C) an electric motor; and
(D) operating means for operating said closing means by a driving power of said motor.

37. A camera according to claim 36, further comprising:
absorption means for absorbing the driving power from said motor when said closing means receives a stopping force, while said motor is driving said closing means.

38. A camera according to claim 37, wherein said absorption means includes an elastic member.

39. A camera according to claim 36, further comprising means for manually operating said closing means.

40. A camera according to claim 26, further comprising
an elastic member for causing said closing means to perform an opening operation.

41. A camera according to claim 36, wherein said operating means includes a switching means for causing said closing means to perform a closing operation.

42. A camera according to claim 41, further comprising:
start means for initiating of an operation of said switching means, said start means being operated by manually moving said closing means in the closing direction.

43. A camera according to claim 36, further comprising:
release means for cutting off the driving power from said transport means to said closing means when said closing means is open.

44. A camera according to claim 36, wherein said operating means comprises means for closing said closing means to perform a closing operation.

45. A camera according to claim 36, wherein said operating means comprises means for causing said closing means to perform an opening operation.

46. A camera comprising:
(A) a cartridge chamber for loading therein a film cartridge containing a film;
(B) closing means for closing said cartridge chamber; and
(C) rotary means for causing said closing means to rotate almost concentrically to the center of rotation of a fork for transmitting a rotative driving power to said cartridge so that said closing means is caused to perform a closing operation.

47. A camera according to claim 46, further comprising:
a motor for driving said closing means.

48. A camera comprising:
(A) a chamber for loading therein image recording means;
(B) closing means for closing said chamber;
(C) transport means for transporting said image recording means; and
(D) operating means for operating said closing means by a driving power of said transport means.

49. A camera according to claim 48, wherein said transport means includes a motor.

50. A camera according to claim 48, further comprising:
absorption means for absorbing the driving power from said transport means when said closing means receives a stopping force, while said transport means is driving said closing means.

51. A camera according to claim 50, wherein said absorption means includes an elastic member.

52. A camera according to claim 48, further comprising means for manually operating said closing means.

53. A camera according to claim 48, further comprising:
an elastic member for causing said closing means to perform an opening operation.

54. A camera according to claim 48, wherein said operating means includes a switching means for causing said closing means to perform a closing operation.

55. A camera according to claim 54, further comprising:
start means for initiating of an operation of said switching means, said start means being operated by manually moving said closing means in the closing direction.

56. A camera according to claim 48, further comprising:
release means for cutting off the driving power from said transport means to said closing means when said closing means is open.

57. A camera according to claim 48, wherein said operating means comprises means for closing said closing means to perform a closing operation.

58. A camera according to claim 48, wherein said operating means comprises means for causing said closing means to perform an opening operation.

59. A camera comprising:
(A) a chamber for loading therein image recording means;
(B) closing means for closing said chamber;
(C) a motor;
(D) operating means for operating said closing means by a driving power of said motor; and
(E) absorption means for absorbing the driving power from said motor when said closing means receives a stopping force, while said motor is driving said closing means.

60. A camera according to claim 59, wherein said absorption means includes an elastic member.

61. A camera according to claim 59, further comprising means for manually operating said closing means.

62. A camera according to claim 59, further comprising:
an elastic member for causing said closing means to perform an opening operation.

63. A camera according to claim 59, wherein said operating means includes a switching means for causing said closing means to perform a closing operation.

64. A camera according to claim 63, further comprising:
   start means for initiating an operation of said switching means, said start means being operated by manually moving said closing means in the closing direction.

65. A camera according to claim 59, further comprising:
   release means for cutting off the driving power from said transport means to said closing means when said closing means is open.

66. A camera according to claim 59, wherein said operating means comprises means for closing said closing means to perform a closing operation.

67. A camera according to claim 59, wherein said operating means comprises means for causing said closing means to perform an opening operation.

68. A camera capable, upon insertion of a film cartridge having a leader of film outside the cartridge into a cartridge chamber of the camera leaving said leader outside the camera, of feeding said leader first backward into the interior of the camera and then forward to a takeup spool of the camera, comprising:
   (A) closing means for closing said cartridge chamber, said closing means being arranged to stop in a partially closed state during the closing operation;
   (B) determining means for determining when the backward feeding of said film leader into the interior of the camera is completed; and
   (C) control means, responsive to completion of the backward feeding determined by said determining means, for causing said closing means to move from the partially closed state during the closing operation to a totally closed state.

69. A camera according to claim 68, wherein said control means includes a motor for driving said closing means.

* * * * *

UNITED STATES PATENT AND TRADEMARK OFFICE
CERTIFICATE OF CORRECTION

PATENT NO. : 4,982,211

DATED : January 1, 1991

INVENTOR(S) : TOYOTOSHI SUZUKI

It is certified that error appears in the above-identified patent and that said Letters Patent is hereby corrected as shown below: ON THE TITLE PAGE:

[30] At Foreign Application Priority Data:

"May 14, 1987 [JP] Japan ... 62-117617" should read
--May 14, 1987 [JP] Japan ... 62-117611--.

[57] Abstract:

Line 10, "porter means." should read --porter.--.

COLUMN 2:

Line 34, "closing" should read --closed--.

COLUMN 4:

Line 11, "framework" should read --framework 8--;
Line 35, "first planet gear 32" should read --first planet gear 23--; and
Line 54, "urges" should read --urges the cam gear 32 to always engage the intermediate gear 31--.

COLUMN 5:

Line 60, "film," should read --film--.

COLUMN 8:

Line 46, "spring 3" should read --spring 36,--.

UNITED STATES PATENT AND TRADEMARK OFFICE
CERTIFICATE OF CORRECTION

PATENT NO. : 4,982,211
DATED : January 1, 1991
INVENTOR(S) : TOYOTOSHI SUZUKI

It is certified that error appears in the above-identified patent and that said Letters Patent is hereby corrected as shown below:

COLUMN 9:

Line 21, "stretch detection circuit 111" should read --stretch detection circuit 107--.

COLUMN 10:

Line 18, "direction Along" should read --direction. Along--;
    Line 44, "that it" should read --that if it--;
    Line 48, "discrimination signal." should read --discrimination switch--; and
    Line 57, "the the" should read --the--.

COLUMN 11:

Line 47, "115 is" should read --Reference numeral 115 represent--;
    Line 52, "the the" should read --the--; and
    Line 68, "inverter 104" should read --inverter 105--.

COLUMN 12:

Line 35, "capable," should read --capable of,--;
    Line 37, "leaving" should read --with--; and
    Line 38, "of" should be deleted.

UNITED STATES PATENT AND TRADEMARK OFFICE
CERTIFICATE OF CORRECTION

PATENT NO. : 4,982,211

DATED : January 1, 1991

INVENTOR(S) : TOYOTOSHI SUZUKI

It is certified that error appears in the above-identified patent and that said Letters Patent is hereby corrected as shown below:

COLUMN 13:

Line 5, "means said" should read --means, said--;
    Line 13, "means" should read --means,--, and close up right margin;
    Line 48, "an;" should read --a motor;--; and
    Line 57, "claim 19," should read --claim 22,--.

COLUMN 14:

Line 7, "an elec-" should read --a--;
    Line 8, "tric" should be deleted;
    Line 9, "capable," should read --capable of,--;
    Line 11, "leaving" should read --with--;
    Line 12, "of" should read --with--;
    Line 14, "a takeup" should read --a film takeup--;
    Line 21, "capable," should read --capable of,--;
    Line 23, "leaving" should read --with--;
    Line 24, "of" should be deleted;
    Line 26, "a takeup" should read --a film takeup--;
    Line 34, "include a electric" should read --includes a--;
    Line 35, "capable," should read --capable of--;
    Line 37, "leaving" should read --with--;
    Line 38, "of" should be deleted; and
    Line 40, "a takeup" should read --a film takeup--.

UNITED STATES PATENT AND TRADEMARK OFFICE
CERTIFICATE OF CORRECTION

PATENT NO. : 4,982,211            Page 4 of 4

DATED : January 1, 1991

INVENTOR(S) : TOYOTOSHI SUZUKI

It is certified that error appears in the above-identified patent and that said Letters Patent is hereby corrected as shown below:

COLUMN 15:

Line 22, "an electric" should read --a--;
　　Line 35, "Claim 26," should read --Claim 36,--;
　　Line 36, "ing" should read --ing:--.

COLUMN 18:

Line 1, "capable," should read --capable of,--;
　　Line 3, "leaving" should read --with--;
　　Line 4, "of" should be deleted; and
　　Line 6, "a takeup" should read --a film takeup--.

Signed and Sealed this

Fourth Day of May, 1993

Attest:

MICHAEL K. KIRK

Attesting Officer     Acting Commissioner of Patents and Trademarks